United States Patent [19]

Gunther

[11] Patent Number: 4,599,410
[45] Date of Patent: Jul. 8, 1986

[54] OXACHALCOGENAZOLE DYES AND PROCESSES FOR THEIR PREPARATION

[75] Inventor: Wolfgang H. H. Gunther, Webster, N.Y.

[73] Assignee: Eastman Kodak Company, Rochester, N.Y.

[21] Appl. No.: 702,693

[22] Filed: Feb. 19, 1985

[51] Int. Cl.$^4$ ............................................. C07D 293/10
[52] U.S. Cl. .................... 544/137; 430/270; 430/495; 544/345; 544/368; 546/82; 546/83; 546/113; 546/118; 546/148; 546/165; 546/198; 546/270; 548/110; 548/113; 548/120; 548/121; 548/149; 548/150; 548/159; 548/161; 548/217; 548/224; 548/225; 548/238; 548/252; 548/305; 548/345; 548/348; 548/371; 548/374; 548/455; 548/518; 548/427; 548/440
[58] Field of Search ...................... 544/137, 345, 368; 546/82, 83, 113, 118, 148, 165, 198, 270; 548/110, 113, 120, 121, 149, 150, 159, 161, 217, 224, 225, 238, 252, 305, 345, 348, 371, 374, 427, 440, 455, 518

[56] References Cited

U.S. PATENT DOCUMENTS 4,446,223  5/1984  Wadsworth et al. ............... 430/338

OTHER PUBLICATIONS

Elwood, "Dyes Containing the Phenaline Ring System, I. Synthesis of Benzothiazole-Containing Dyes", *Journal of Organic Chemistry*, 38, 2425–2430, (1973).
*Research Disclosure*, vol. 176, Dec. 1978, Item 17643.

*Primary Examiner*—Richard L. Raymond
*Attorney, Agent, or Firm*—Carl O. Thomas

[57] ABSTRACT

Methine dyes are disclosed which contain a 2-halo or pseudohalo substituted 1,2,5-oxatellurazole ring fused with an aromatic nucleus, the aromatic nucleus being substituted with a methine linkage terminating in an auxochrome providing a conjugated resonance chromophore. The dyes can be formed by condensing a methine linkage precursor with a compound containing an oxatellurazole ring fused with an aromatic nucleus. The dyes are useful in optical recording elements and in photographic elements.

23 Claims, No Drawings

OXACHALCOGENAZOLE DYES AND PROCESSES FOR THEIR PREPARATION

FIELD OF THE INVENTION

This invention is directed to novel methine dyes containing a 1,2,5-oxatellurazole ring fused with an aromatic nucleus, to methods and intermediates for their preparation, and to articles incorporating such dyes, including photographic elements and optical recording elements.

BACKGROUND OF THE INVENTION

In Gunther et al U.S. Ser. No. 660,155, filed Oct. 12, 1984, titled PHOTOGRAPHICALLY USEFUL CHALCOGENAZOLES, CHALCOGENAZOLINES, AND CHALCOGENAZOLINIUM AND CHALCOGENAZOLIUM SALTS there are disclosed compounds containing an aromatic ring portion fused with a tellurazolium or derivative tellurazole, tellurazoline (including tellurazolinylidene), or tellurazolinium ring portion together with processes and intermediates for their preparation. Methine dyes containing tellurazolinylidene and tellurazolium ring portions are disclosed to be useful as sensitizers in silver halide photographic elements. Among other intermediates for preparing the tellurium containing methine dye nuclei are disclosed aromatic compounds including a 2-halo or pseudohalo-1,2,5-oxatellurazole ring portion fused with an aromatic nucleus; however, there is no disclosure of any methine dye containing a 1,2,5-oxatellurazole ring.

Elwood, "Dyes Containing the Phenaline Ring System. I. Synthesis of Benzothiazole-Containing Dyes", *Journal of Organic Chemistry*, 38, 2425–2430 (1973) reports a nucleophilic substitution of alkoxyphenalenium fluoroborates when treated with 3-ethyl-2-methylbenzothiazolium fluoroborate. The direct displacement of a carbocyclic aromatic ring hydrogen by a methylene base is stated to be "unusual chemistry". There is no suggestion of the observations being applicable to other compounds containing carbocyclic aromatic rings.

Wadsworth et al U.S. Pat. No. 4,446,223 is representative of optical recording elements containing a dye in a binder as a layer on a support.

*Research Disclosure*, Vol. 176, December 1978, Item 17643, is illustrative of a general teaching relating to photographic elements containing one or more silver halide emulsion layers. *Research Disclosure* is published by Kenneth Mason Publications, Ltd., 8 North Street, Emsworth, Hampshire P010 7DD, England. Dostes et al U.S. Pat. No. 3,237,008 is illustrative of a photographic element containing silver halide emulsion layers desensitized to light.

SUMMARY OF THE INVENTION

In one aspect, this invention is directed to a methine dye which consists of a 2-halo or pseudohalo-1,2,5-oxatellurazole ring fused with an aromatic nucleus, the aromatic nucleus being substituted with a methine linkage terminating in an auxochrome providing a conjugated resonance chromophore extending from the auxochrome to the tellurium atom of said oxatellurazole ring.

In another aspect this invention is directed to an optical recording element comprised of a support and, coated thereon, a layer of an amorphous composition having an absorption factor of at least 20 comprised of a binder and a dye, characterized in that the dye is a methine dye according to this invention.

In an additional aspect this invention is directed to a photographic element containing a dye and comprised of a support and, coated thereon, one or more layers, including at least one radiation recording layer, characterized in that the dye is a methine dye according to this invention.

In still another aspect this invention is directed to a process of preparing a methine dye which in one resonance form can be represented by the formula:

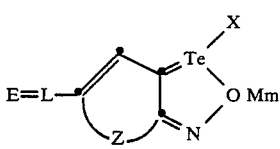

comprising condensing a 2-halo or pseudohalo-1,2,5-oxatellurazole of the formula:

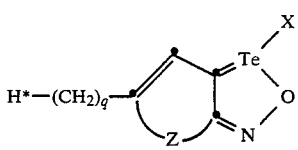

with a chromophore completing compound of the formula:

E—L' wherein
H* is an activated hydrogen atom;
E represents an auxochrome;
L represents a methine linkage;
L' represents a methine linkage precursor;
M represents a charge balancing counterion;
m is zero or 1;
q is zero or 1;
X is halogen or pseudohalogen; and
Z represents the atoms completing an aromatic nucleus.

It has been discovered that an aromatic nucleus fused with a 2-halo or pseudohalo-1,2,5-oxatellurazole ring can undergo a condensation reaction with a methine linkage precursor at a carbon atom of the aromatic nucleus or a methyl substituent of the aromatic nucleus. This is quite unusual, since aromatic nuclei fused with five membered heterocyclic rings, such as thiazole, selenazole, imidazole, and oxazole rings, do not provide condensation sites either at aromatic nucleus carbon atoms or their alkyl substituents.

When a methine linkage precursor terminating in an auxochrome is condensed with an activated aromatic nucleus fused with a 1,2,5-oxatellurazole ring, hereinafter referred to as an aromatic 1,2,5-oxatellurazole nucleus, a methine dye is formed. Such dyes are marked by high levels of stability and absorption peaks at relatively longer wavelengths than would be expected based on the number of methine groups in the chromophore. These advantages are believed to derive from the presence of the tellurium atom in both the fused heterocyclic ring and in the chromophore of the dye.

The stability and absorption properties of the methine dyes of this invention render such dyes useful in optical recording elements which rely on dye absorption to concentrate energy from an electromagnetic exposure source in a deformable binder layer. Inasmuch as the methine dyes of this invention can be chosen to absorb light in the longer wavelength regions of the spectrum, they are well suited for use in optical recording elements intended to respond to diode laser exposure sources of 750 nm or longer wavelengths. The stability of the dyes assures long life for the optical recording elements.

The methine dyes of this invention can also be usefully incorporated into photographic elements. The dyes can be employed in antihalation and filter layers. They can be incorporated in photographic supports. They are also useful as desensitizers for radiation sensitive silver halide grains.

From a knowledge of their wavelengths of absorption and stability other uses of the dyes of this invention will be readily suggested.

DESCRIPTION OF PREFERRED EMBODIMENTS

The methine dyes of this invention consist of an aromatic 1,2,5-oxatellurazole nucleus (as defined above) an aromatic ring portion of which is substituted with a methine linkage terminating in an auxochrome. The tellurium atom of the 1,2,5-oxatellurazole ring and the auxochrome are bonded through intervening carbon atoms which are in part provided by the aromatic nucleus fused with the 1,2,5-oxatellurazole ring and are in part provided by the methine linkage. In tracing the linkage between the tellurium atom and the auxochrome through the intervening carbon atoms, a pattern of alternate single and double bonds are present, and the dye can be represented by each of two different formulae, representing differing resonance state extremes, in which the positions of the double and single bonds linking the carbon atoms are interchanged. That is, the bonds joining the tellurium atom and the auxochrome form a conjugated resonance chromophore.

The general features of the dyes of this invention can be appreciated by considering their synthesis. In one resonance state of an aromatic 1,2,5-oxatellurazole nucleus employed as a starting material for the synthesis of the dyes of this invention the tellurium atom of the 1,2,5-oxatellurazole ring can be represented as a tetravalent atom having three of its four valences satisfied by the heterocyclic ring of which the tellurium atom is a part and a fourth valence satisfied by a markedly electronegative ring substituent, such as a 2-halo or pseudohalo substituent. In a second resonance form the tellurium atom in the 1,2,5-oxatellurazole ring can be represented as a divalent atom with the electronegative ring substituent having reverted to the form of a separate anion. In this latter form it is believed that the electron loss represented by anion dissociation is compensated for by electron attraction from the fused aromatic nucleus to the 1,2,5-oxatellurazole ring. This, together with any independent tendency toward electron donation to the tellurium containing ring by the aromatic nucleus, activates at least one of the aromatic nucleus ring carbon atoms or a methyl substituent thereof as a reaction site. The activated ring carbon atom of the aromatic nucleus, in one resonance form, can be viewed as a carbonium ion. When this same carbon atom is methyl substituted, deprotonation of the methyl substituent in one resonance form produces a carbanion. The carbonium (positive) or carbanion (negative) site in the aromatic nucleus provides a ready reaction site for methine linkage attachment.

While varied implementations are possible consistent with the general description above, the invention is further illustrated by reference to certain preferred embodiments. In a preferred form the dyes of this invention can be represented in alternate resonance forms by the formulae:

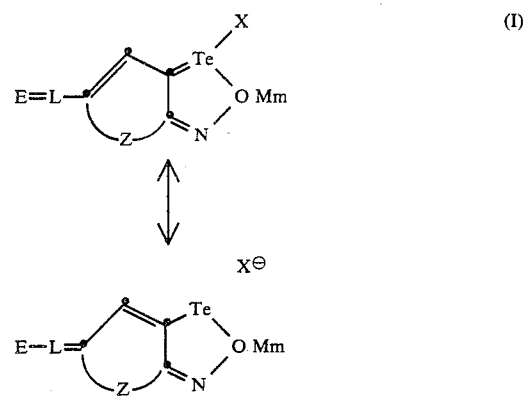

wherein
E represents an auxochrome;
L represents a methine linkage;
M represents a charge balancing counterion;
m is zero or 1;
X represents halogen or a pseudohalogen; and
Z represents the atoms completing an aromatic nucleus.

Such dyes can be prepared by condensing a 2-halo or pseudohalo-1,2,5-oxatellurazole according to formula II:

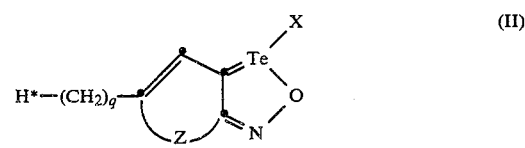

with a chromophore completing compound according to formula (III):

E—L'  (III)

wherein

H* is an activated hydrogen atom;
E, L, X, and Z are as defined in formulae I;
L' represents a methine linkage precursor; and
q is zero or 1.

The auxochrome can take any conventional form found in methine dyes. Typically the auxochrome is provided by a nitrogen or chalcogen atom which resonates in the dye between a charged and an uncharged state. For example, it can take the form of any of the auxochromes found in cyanine, merocyanine, oxonol, pyrylium, or thiapyrylium dyes. However, the auxochromes need not be confined to such classes. Though less common, auxochromes provided by other atoms, such as phosphorus or boron, are contemplated. For example, 2-triphenylphosphoro-1,3-cyclopentadien-5-yl is a known methine dye nucleus.

The methine linkage can be provided by one or more methine groups each consisting of a single carbon atom and a single hydrogen atom. The hydrogen atom can be optionally replaced by a substituent, typically an alkyl group of 8 or fewer carbon atoms, most commonly a methyl or ethyl group. Such substituents are known to be advantageous in modifying directly or indirectly absorption properties of methine dyes. In addition the methine groups can form a part of one or more rings. A methine group substituent can join two methine groups to form a ring or can form a ring with the auxochrome.

From formulae I it is apparent that the aromatic 1,2,5-oxatellurazole nucleus itself provides three methine groups in the chromophore linking the tellurium atom and the auxochrome. As is appreciated by those skilled in the art, the number of methine groups in methine dyes can be widely varied, with absorption peak wavelengths increasing as the number of methine groups are increased. While the methine linkage L can consist of any conventional number of methine groups—e.g. 20 or more, it is a distinct advantage that the methine dyes of this invention achieve longer wavelength peak absorptions with fewer methine groups than conventional methine dyes. Thus, generally L can be viewed as encompassing 10 or fewer methine groups.

Because of their close relation, frequently both being present in a common ring structure, it is convenient to consider illustrations of auxochromes and methine linkages together.

A quaternized nitrogen atom containing auxochrome can be illustrated by formulae IV:

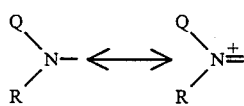

wherein
R is a quaternizing substituent and
Q is a quaternizing substituent which (i) is an independent quaternizing substituent, (ii) completes with R a heterocyclic ring, or (iii) completes with the methine linkage a heterocyclic ring.

When Q satisfies (i) or (ii), the auxochrome of formulae IV can be represented by formulae V:

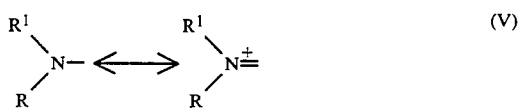

wherein
R and $R^1$ are quaternizing substituents which are independent or together form a heterocyclic ring.

Dyes containing auxochromes satisfying formula (V) can be conveniently synthesized when L—E' in formula III is a tertiary ethyl amine. Upon reaction the ethyl substituent forms a dimethine or vinyl linkage in the dye chromophore while the remaining substituents necessary to complete a tertiary amine form R and $R^1$. For this synthetic preparation it is highly advantageous to employ triethyl amine as the tertiary ethyl amine, resulting in both R and $R^1$ being ethyl substituents. However, by alternate choices of tertiary ethyl amines, R and $R^1$ can independently take the form of other hydrocarbon groups, such as aryl, alkaryl, aralkyl, or other alkyl groups as well as substituted derivatives, such as oxy, thio, sulfo, sulfonyl, sulfato, halo, or carboxy substituted derivatives. In addition to optionally substituted hydrocarbon groups, R and $R^1$ can independently take the form of other groups, such as cyano, alkoxy, aryloxy, or ester groups. R and $R^1$ can each contain up to about 20 carbon atoms, but preferably contain 6 or fewer carbon atoms. Specific examples of independent R and $R^1$ groups are cyano, methyl, ethyl, chloropropyl, butyl, bromopentyl, hexyl, methoxy, ethoxy, propoxy, butoxy, pentoxy, hexoxy, hydroxymethyl, hydroxyethyl, hydroxypropyl, hydroxybutyl, hydroxypentyl, hydroxyhexyl, methoxycarbonyl, ethyloxycarbonyl, propoxycarbonyl, butoxycarbonyl, hexoxycarbonyl, phenyl, tolyl, xylyl, benzyl, and phenethyl groups.

By employing a heterocyclic tertiary ethyl amine for synthesis R and R' can together form a heterocyclic ring. R and R' can form with the nitrogen atom of formulae V any one of a variety of common heterocyclic rings. For example, N-ethyl substituted pyrrolidine, piperidine, morpholine, piperazine, tetrahydropyridine, dihydropyridine, and tetrahydroquinoline are illustrative of heterocyclic tertiary amines useful in forming the auxochromes of formula V. It is to be noted that both R and $R^1$ are each singly bonded to the nitrogen atom in formulae V, precluding their forming an aromatic heterocyclic ring which includes the nitrogen atom. R and $R^1$ can form with the nitrogen atom in formula V a nonaromatic heterocyclic ring of any convenient number of ring atoms—e.g., 4 to 12 ring atoms, although 5 or 6 membered heterocyclic rings are generally most conveniently provided.

When Q in formulae IV forms with the methine linkage a heterocyclic ring, a methine linkage and basic nucleus similar to that found in cyanine dyes are present in the dyes of this invention. The basic nucleus completes a five or six membered heterocyclic ring consisting of ring atoms chosen from among carbon, nitrogen, and chalcogen (typically oxygen, sulfur, and selenium) atoms. In one general form the resulting methine dyes according to this invention can be presented by formulae VI:

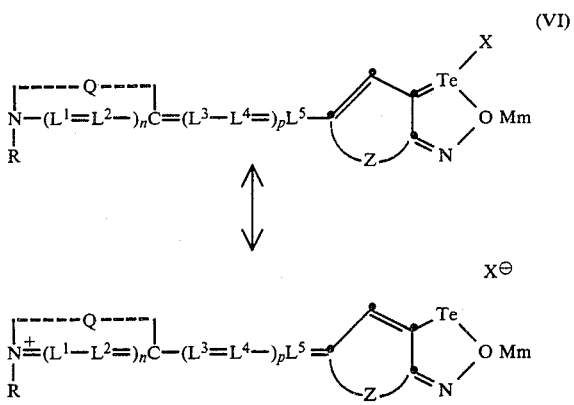

wherein
L¹, L², L³, L⁴, and L⁵ are methine groups;
M represents a charge balancing counterion;
m is zero or 1;
n is zero or 1;
p is zero, 1, 2, or 3;
Q represents the atoms completing a heterocyclic ring;
R is a quaternizing substituent;
X represents halogen or pseudohalogen; and
Z represents the atoms completing an aromatic nucleus.

Q can complete a nucleus comprised of an azolinylidene or azinylidene ring in one resonance form or an azolium or azinium ring in an alternate resonance form and satisfying formulae VI. It is specifically contemplated that Q can be chosen from among benzotellurazolinylidene, naphthotellurazolinylidene, 2- or 4-pyridylidene, imidazopyridylidene, 2- or 4-quinolinylidene, 1- or 3-isoquinolinylidene, benzoquinolinylidene, thiazoloquinolylidene, imidazoquinolylidene, 3H-indolylidene, 1H or 3H-benzindolylidene, oxazolinylidene, oxazolidinylidene, benzoxazolinylidene, naphthoxazolinylidene, oxadiazolinylidene, thiazolidinylidene, phenanthrothiazolinylidene, acenaphthothiazolinylidene, thiazolinylidene, benzothiazolinylidene, naphthothiazolinylidene, tetrahydrobenzothiazolinylidene, dihydronaphthothiazolinylidene, thiadioxazolinylidene, selenazolidinylidene, selenazolinylidene, benzoselenazolinylidene, naphthoselenazolinylidene, selenadiazolinylidene, pyrazolylidene, imidazolinylidene, imidazolidinylidene, benzimidazolinylidene, naphthimidazolinylidene, diazolinylidene, tetrazolinylidene, and imidazoquinoxalinylidene nuclei.

The quaternizing substituent R in formula VI can take the form of any useful cyanine dye quaternizing substituent. For example, R can take the form of a hydrocarbon substituent, such as an alkyl, alkenyl, alkynyl, or aralkyl moiety as well as substituted derivatives, such as oxy, thio, sulfo, sulfonyl, sulfato, halo, or carboxy substituted derivatives, often incorporated to modify solubility or other physical properties. Substituents of from 1 to 6 carbon atoms are generally preferred, with alkyl and sulfoalkyl substituents being most advantageous.

In another general form Q can again complete a basic heterocyclic nucleus of the type found in cyanine dyes, but of a structural form differing from that of formulae VI, as illustrated by formulae VII:

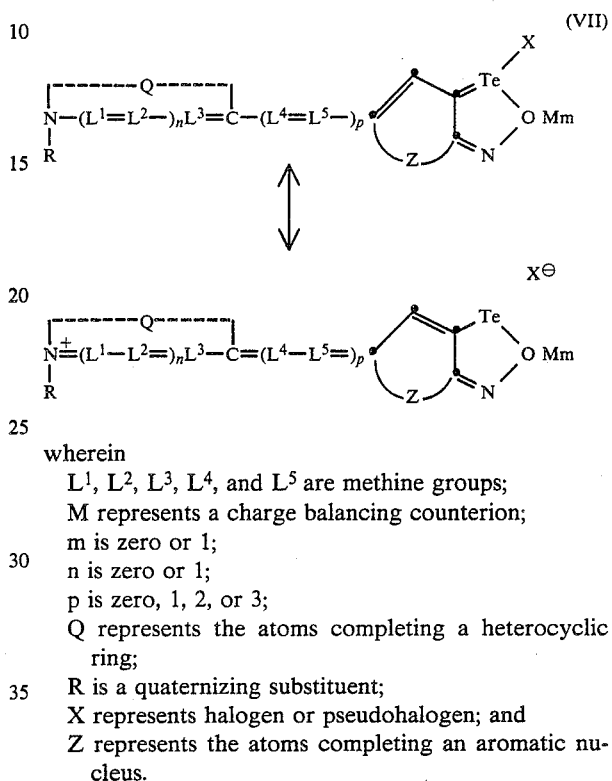

wherein
L¹, L², L³, L⁴, and L⁵ are methine groups;
M represents a charge balancing counterion;
m is zero or 1;
n is zero or 1;
p is zero, 1, 2, or 3;
Q represents the atoms completing a heterocyclic ring;
R is a quaternizing substituent;
X represents halogen or pseudohalogen; and
Z represents the atoms completing an aromatic nucleus.

Q can complete a nucleus comprised of a azolinylidene or azinylidene ring satisfying formula VII. It is specifically contemplated that Q can be chosen from among basic heterocyclic nuclei of the type found in cyanine dyes, such as pyrrolylidene, indolylidene, carbazolylidene, benzindolylidene, pyrazolylidene, indazolylidene, and pyrrolopyridinylidene nuclei. The quaternizing substituent R in formulae VII can be chosen similarly as R in formulae VI.

In an alternate preferred form the auxochrome and methine linkage E=L— and E—L= shown in formulae I can be represented by formulae VIII:

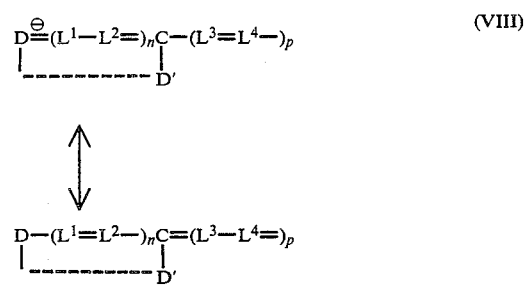

with the resulting methine dye as a whole being represented by formulae IX:

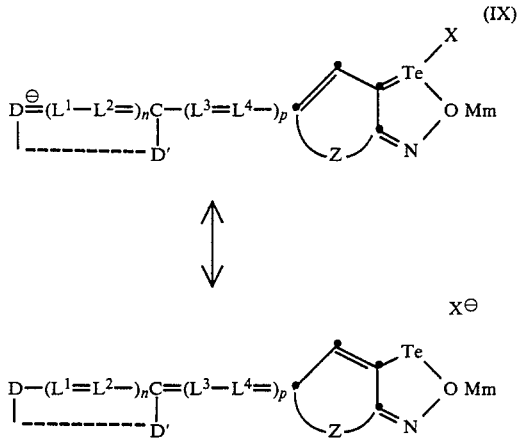

wherein
D and D' are independent groups with D being a cyano, sulfo, or carbonyl group and D' being a methine substituent or D and D' together form a heterocyclic ring;
$L^1$, $L^2$, $L^3$, and $L^4$ are methine groups;
M represents a charge balancing counterion;
m is zero or 1;
n is zero or 1;
p is zero, 1, 2, or 3;
X represents halogen or pseudohalogen; and
Z represents the atoms completing an aromatic nucleus.

In this form of the invention it can be seen that formulae VIII include acidic nuclei of the type found in merocyanine and oxonol dyes. When formulae VIII represent an acyclic group—that is, when D and D' are independent groups, the methine linkage can terminate in groups such as malononitrile, alkylsulfonylacetonitrile, cyanomethyl benzofuranyl ketone, or cyanomethyl phenyl ketone. D and D' can together complete a nucleus comprised of a five or six membered heterocyclic ring consisting of ring atoms chosen from among carbon, nitrogen, and chalcogen (typically oxygen and sulfur) atoms. In preferred cyclic forms, D, and D' together complete a 2-pyrazolin-5-one, pyrazolidene-3,5-dione, imidazoline-5-one, hydantoin, 2 or 4-thiohydantoin, 2-iminooxazoline-4-one, 2-oxazoline-5-one, 2-thiooxazolidine-2,4-dione, isoxazoline-5-one, 2-thiazoline-4-one, thiazolidine-4-one, thiazolidine-2,4-dione, rhodanine, thiazolidine-2,4-dithione, isorhodanine, indane-1,3-dione, thiophene-3-one, thiophene-3-1,1-dioxide, indoline-2-one, indoline-3-one, indazoline-3-one, 2-oxoindazolinium, 3-oxoindazolinium, 5,7-di-oxo-6,7-dihydrothiazolo[3,2-a]pyrimidine, cyclohexane-1,3-dione, 3,4-dihydroisoquinoline-4-one, 1,3-dioxane-4,6-dione, barbituric acid, 2-thiobarbituric acid, chroman-2,4-dione, indazoline-2-one, or pyrido[1,2-a]pyrimidine-1,3-dione nucleus. Conventional substituents of the rings are contemplated.

X in formulae I, II, VI, VII, and IX is a strongly electronegative substituent, such as halogen (employed here and elsewhere to designate generically chloride, bromide, or iodide) or pseudohalogen. By the term "pseudohalogen" it is intended to designate one of the art recognized class of substituents known to approximate the substituent properties of halogen, such as a cyano, thiocyanate, or hydroxy substituent. Since halogen provide the desired substituent properties in a single atom, they are in general preferred over pseudohalogen group. Chloride is preferred over bromide and both are preferred to iodide.

In formulae I, II, VI, VII, and IX, Z represents the atoms completing an aromatic nucleus. By referring to formulae II and III it can be seen that the condensation reaction completing the chromophore is dependent on the aromatic 1,2,5-oxatellurazole nucleus having an activated hydrogen atom associated with the aromatic nucleus, either bonded to a ring carbon atom or bonded to a methyl substituent of the ring carbon atoms. The necessary activation can be achieved by choosing an aromatic nucleus fused with the 1,2,5-oxatellurazole ring that is to some extent electron deficient at one or more ring carbon atoms, which can result from the presence of one or more electron withdrawing substituents, the choice of fused rings, or a combination of both. Once a methine dye according to the invention is formed, it is, of course, recognized that substituents or nuclei configurations incorporated solely for the purpose of activation can, but need not, be retained in the methine dye in its final form.

Specifically preferred aromatic 1,2,5-oxatellurazole nuclei contemplated for use in the practice of this invention are naphth[2,1-c]-1,2,5-oxatellurazole nuclei. Preferred naphth[2,1-c]-1,2,5-oxatellurazole nuclei, which are preferred embodiments of the compounds generically illustrated by formula II, can be represented by formula X:

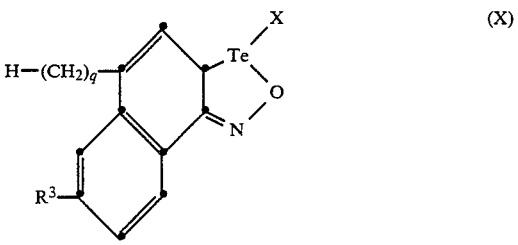

wherein
q is zero or 1;
$R^3$ is selected from the group consisting of hydrogen, halogen, alkyl, or alkoxy; and
X is halogen or pseudohalogen.

The preparation of compounds satisfying formula X can be illustrated by placing in solution an optionally substituted α-tetralone, hydrochloric or hydrobromic acid, tellurium dioxide, and hydroxylamine. This reaction has the advantage that all of the required materials are readily available at relatively low cost. Alcohols are convenient solvents for the reaction, although other nonreactive organic solvents can be employed. Heating is not required, but can accelerate the reaction. The material of formula X forms a solid phase which can be separated by routine filtering and washing steps. Both unsubstituted α-tetralone and various substituted derivatives are useful. Preferred α-tetralones can be represented by the formula XI:

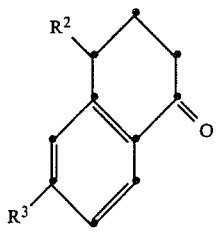

(XI)

wherein $R^2$ corresponds to $H-(CH_2)_q-$, which represents either hydrogen or methyl, and $R^3$ is independently selected from among hydrogen, halogen, alkyl, and alkoxy. When $R^2$ is methyl, it forms one methine group of the final dye. Similarly, $R^3$, unless intentionally displaced, forms a substituent of the final dye.

In general alkyl substituents and moieties of the methine dyes of this invention are limited only by physical considerations, such as solubility, mobility, and molecular bulk. Generally alkyl and other aliphatic moieties of the methine dyes of this invention are contemplated to contain up to 20 or more carbon atoms. Since increasing molecular bulk, except as sometimes required to reduce mobility, is seldom needed, the preferred aliphatic hydrocarbon moieties contain up to 6 carbon atoms, with the lower alkyls (i.e., methyl, ethyl, propyl, and butyl) being preferred. In general, references to cycloalkyl indicate groups having 4 to 10 carbon atoms in a ring, with 5 or 6 ring carbon atoms being preferred.

Instead of preparing the starting material of formula X in the manner described above, an oxime of an α-tetralone described above can be reacted with tellurium tetrahalide, preferably tellurium tetrachloride or tellurium tetrabromide. In this and subsequent descriptions of employing tellurium tetrahalides as reactants it should be borne in mind that similar results can usually be obtained by reacting, before or during the α-tetralone reaction, a soluble halide salt, such as an alkali or alkaline earth halide, with tellurium dioxide. This is believed to generate a tellurium tetrahalide. A carboxylic acid can be employed as a solvent for the reaction, and the reaction can be accelerated by heating. The starting material of formula X forms a solid phase which can be separated by routine filtering and washing procedures. The preferred α-tetralone oximes correspond to the preferred α-tetralones and can be represented by the formula XII:

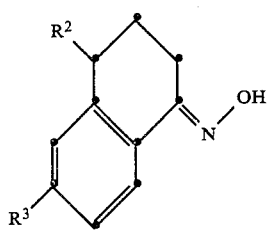

(XII)

wherein $R^2$ and $R^3$ are chosen as described above.

The preparation of dyes according to this invention containing an aromatic 1,2,5-oxatellurzole nucleus and a nucleus of the type found in hemicyanine dyes, shown in formulae V, can be illustrated by the following description of preferred dyes according to this invention satisfying formulae XIII:

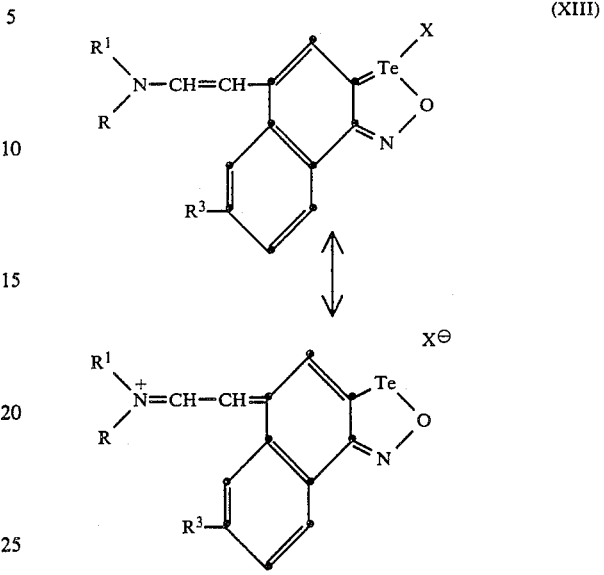

(XIII)

wherein R, $R^1$, $R^3$, and X can take any of the forms previously described.

To prepare the methine dye according to formulae XIII a tertiary ethylamine is condensed with a naphth[2,1-c]-1,2,5-oxatellurazole according to formula XIV:

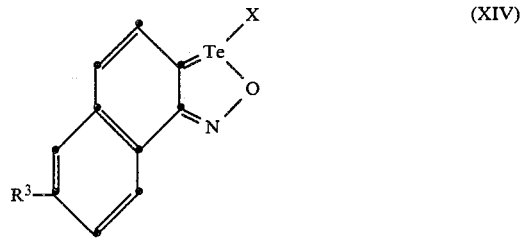

(XIV)

wherein $R^3$ and the tertiary ethylamine is chosen as previously described. The reaction is undertaken in a convenient mutual solvent with an amount of the tertiary ethylamine present at least stoichiometrically equal to the amount of the aromatic 1,2,5-oxatellurazole. The reaction is driven by heating to at least about 60° C., with refluxing temperatures of up to about 120° C. being contemplated. Preferred reaction temperatures are in the range of from about 80° to 100° C. Solvents can be chosen from among a large variety known to be useful in these temperature ranges, including acetonitrile; aliphatic and aromatic hydrocarbons, such as benzene, toluene, xylene, and decane, as well as their halogenated analogues; high boiling ethers; pyridine; dimethylsulfoxide; and dimethylformamide.

Specifically preferred methine dyes according to this invention which contain a basic nucleus of the type found in cyanine dyes and a naphth[2,1-c]-1,2,5-oxatellurazole nucleus are illustrated by formulae XV:

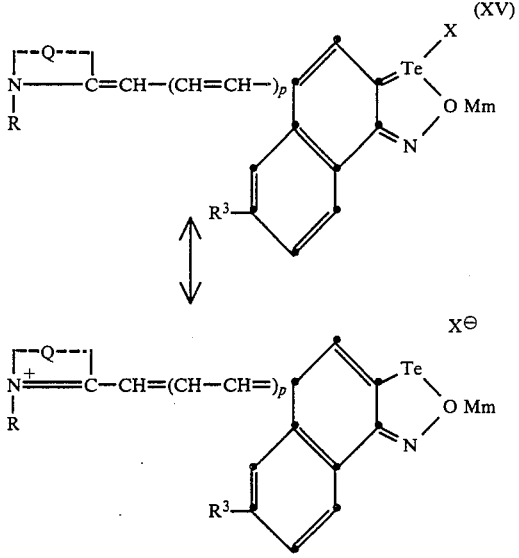

(XV)

(XV)

wherein

M represents a charge balancing counterion;
m and p are independently zero or 1;
Q represents the atoms completing a heterocyclic ring; and
R is a quaternizing substituent;
$R^3$ is selected from the group consisting of hydrogen, halogen, alkyl, and alkoxy;
X is halogen or pseudohalogen.

Specifically preferred methine dyes according to this invention which contain an acidic nucleus of the type found in oxonol and merocyanine dyes and a naphth[2,1-c]-1,2,5-oxatellurazole nucleus are illustrated by formulae XVI:

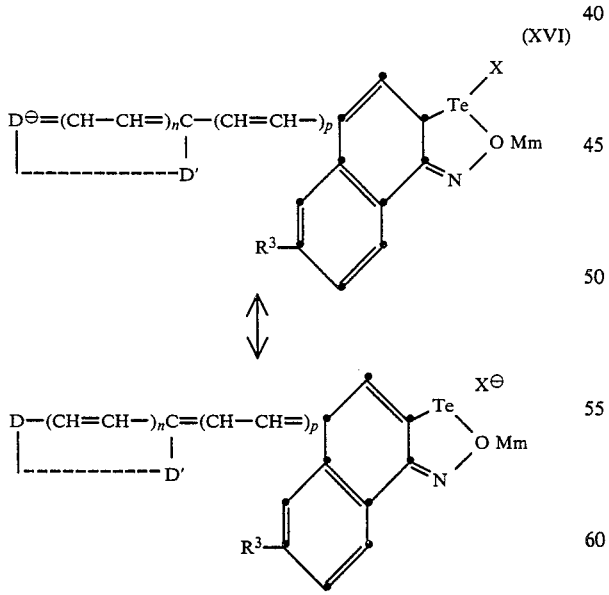

(XVI)

wherein

D and D' are independent groups with D being a cyano, sulfo, or carbonyl group and D' being a methine substituent or D and D' together form a heterocyclic ring;

M represents a charge balancing counterion;
m, n, and p are independently zero or 1;
$R^3$ is selected from the group consisting of hydrogen, halogen, alkyl, and alkoxy; and
X represents halogen or pseudohalogen.

To prepare methine dyes according to this invention containing a basic nucleus of the type found in cyanine dyes, as illustrated in formulae VI, VII, and XV, or an acidic nucleus of the type found in oxonol or merocyanine dyes, as illustrated in formulae VIII, IX, and XVI, a different synthetic approach is employed than that discussed above for preparing dyes having nuclei of the type found in hemicyanine dyes, as illustrated by formulae V and XIV. One such approach, which forms a second synthetic process according to this invention, can be employed to prepare a methine dye satisfying the requirements of formulae VI, VII, VIII, IX, XV, and XVI. This second process is illustrated below for a naphth[2,1-c]-1,2,5-oxatellurazole nucleus, but can be applied to the synthesis of novel methine dyes according to this invention containing other aromatic 1,2,5-oxatellurazole nuclei, such as those illustrated by formula II when q is zero, if desired.

To illustrate the second process of this invention in one exemplary form, novel methine dyes according to this invention which satisfy formulae XVII:

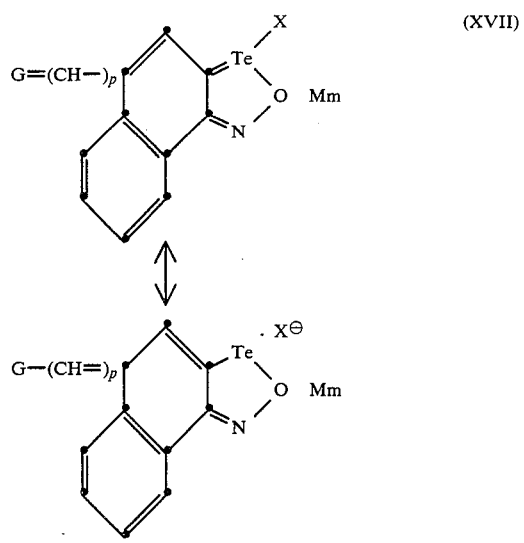

(XVII)

can be prepared by a process comprising condensing a 2-halo or pseudohalonaphth[2,1-c]-1,2,5-oxatellurazole which in one resonance form can be represented by formula XVIII:

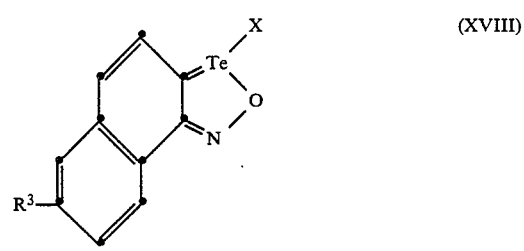

(XVIII)

with an auxochrome and methine linkage precursor which in one resonance form can be represented by formula XIX:

$$G-(CH_2)_n-H \qquad (XIX)$$

wherein
G is chosen from the group represented by formulae XX, XXI, and XXII:

$$\begin{array}{c} \overline{\phantom{--}Q^1\phantom{--}} \\ N^+=(L^1-L^2=)_nC-, \\ | \\ R \end{array} \qquad (XX)$$

$$\begin{array}{c} \overline{\phantom{--}Q^2\phantom{--}} \\ N-(L^1=L^2-)_nL^3=C-, \text{ and} \\ | \\ R \end{array} \qquad (XXI)$$

$$\begin{array}{c} D^{\ominus}=(L^1-L^2=)C-; \\ | \\ \overline{\phantom{------}D'} \end{array} \qquad (XXII)$$

D and D' are independent groups with D being a cyano, sulfo, or carbonyl group and D' being a methine substituent or D and D' together form a heterocyclic ring;
L¹ and L² represent methine groups;
M represents a charge balancing counterion;
m, n, and p are independently zero or 1;
Q¹ and Q² represent the atoms completing a heterocyclic ring;
R is a quaternizing substituent;
R³ is selected from the group consisting of hydrogen, halogen, alkyl, and alkoxy; and
X is halogen or pseudohalogen.

When G in formula XIX satisfies formula XX or XXI and n is 1, it is apparent that the resulting compound is a methyl quaternary salt, acts as a source of the corresponding methylene base. Condensation reactions of like or dissimilar methylene bases are well known techniques for preparing monomethine cyanine dyes. Such reactions are illustrated by T. H. James, *The Theory of the Photographic Process*, 4th Ed., Macmillan, 1977, Chapter 8, p. 206.

Whereas methylene base condensations to prepare cyanine dyes require that each of the two basic nuclei to be reacted contain a reactive substituent, it has been discovered that the naphth[2,1-c]-1,2,5-oxatellurazole nucleus of formula XVIII is subject to nucleophilic attack at its 5-position ring carbon atom. By contrast the fused carbocyclic aromatic rings of basic nuclei of the type employed in preparing cyanine dyes are not susceptible to direct methylene base substitution. Thus, although the condensation reaction of a methylene base and an activated aromatic 1,2,5-oxatellurazole nucleus, specifically described in terms of a naphth[2,1-c]-1,2,5-oxatellurazole nucleus in formula XVIII, can be conducted in the general manner employed in preparing cyanine dyes by methylene base condensation reactions, the fact that the aromatic 1,2,5-oxatellurazole nucleus reacts at a ring carbon atom of fused a aromatic nucleus is unexpected from a knowledge of cyanine dye syntheses.

Similarly, when in formula XIX n is zero and G satisfies formula XXII, the resulting compound is a ketomethylene or cyanomethylene which undergoes condensation with an activated aromatic 1,2,5-oxatellurazole nucleus to produce a merocyanine dye. Again, the fused carbocyclic aromatic rings of basic nuclei of the type employed in preparing cyanine and merocyanine dyes are not susceptible to direct ketomethylene or cyanomethylene substitution. Although the condensation reaction of a ketomethylene or cyanomethylene nucleus and an activated aromatic 1,2,5-oxatellurazole nucleus, specifically described in terms of a naphth[2,1-c]-1,2,5-oxatellurazole nucleus in formula XVIII, can be conducted in the general manner employed in preparing merocyanine dyes, the fact that the aromatic 1,2,5-oxatellurazole nucleus reacts at a ring carbon atom of the fused aromatic nucleus is unexpected from a knowledge of merocyanine dye syntheses.

In general, procedures similar to those employed in preparing cyanine and merocyanine dyes can be employed in the condensation reaction of the compounds of formulae XVIII and XIX. The condensation reactions can occur at room temperature or optionally can be accelerated by heating. The solvents described above for the tertiary ethylamine condensation reaction of the first described process of methine dye preparation can be employed. In addition, since heating to drive the condensation reaction of the second process is not required, lower boiling solvents, such as alkanols of from 1 to 6 carbon atoms, can be employed. Acetonitrile, pyridine, and dimethylformamide are specifically illustrative of common solvents. For condensations employing a methylene base an organic base, such as a tertiary amine (e.g., triethylamine), tetramethylguanidene, piperidene, or diazobicyclohexane, is also employed.

The second synthetic process of this invention is useful in preparing methine dyes according to this invention in which the aromatic 1,2,5-oxatellurazole nucleus is joined to a basic nucleus of the type found in cyanine dyes by a single methine group or is joined directly to an acidic nucleus of the type found in oxonol and merocyanine dyes. Thus, the methine dyes prepared by the second synthetic process are analogous to simple or monomethine cyanine dyes and zero methine merocyanine dyes, respectively.

A third synthetic process of this invention allows the synthesis of methine dyes containing three or more methine groups joining the aromatic 1,2,5-oxatellurazole nucleus and the remaining basic or acidic nucleus. Again, using a naphth[2,1-c]-1,2,5-oxatellurazole nucleus to exemplify a suitably reactive aromatic 1,2,5-oxatellurazole nucleus, the methine dyes which can be synthesized by this third process can be represented by formulae XXIII:

$$G-CH=(L^1-L^2=)_pL^3=CH-G' \qquad Mm \qquad (XXIII)$$

$$\updownarrow$$

$$G=CH-(L^1=L^2-)_pL^3-CH=G' \qquad Mm$$

these dyes being prepared by performing a first condensation reaction of a compound of according to formula XXIV:

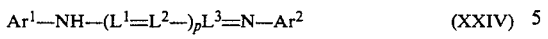

$$Ar^1-NH-(L^1{=}L^2-)_pL^3{=}N-Ar^2 \quad (XXIV)$$

with a compound of according to formula XXV:

$$G-CH_3 \quad (XXV)$$

and then performing a second condensation reaction of the product of the first condensation reaction with a compound according to formula XXVI:

$$G'-CH_3 \quad (XXVI)$$

wherein $Ar^1$ and $Ar^2$ are carbocyclic aromatic groups;

G and G' can be selected from the group members which can be represented by the formulae XXVII, XXVIII, XXIX, and XXX:

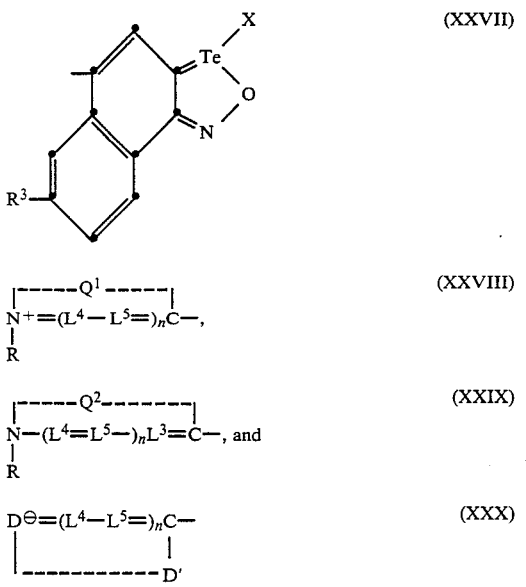

provided that at least one of G and G' satisfy formula XXVII;

D and D' are independent groups with D being a cyano, sulfo, or carbonyl group and D' being a methine substituent or D and D' together form a heterocyclic ring;

$L^1$, $L^2$, $L^3$, $L^4$, and $L^5$ represent methine groups;

M represents a charge balancing counterion;

m is zero or 1;

n is zero or 1;

p is zero or a positive integer, typically 1, 2, or 3;

$Q^1$ and $Q^2$ represent the atoms completing a heterocyclic ring;

R is a quaternizing substituent;

$R^3$ is selected from the group consisting of hydrogen, halogen, alkyl, and alkoxy; and X is halogen or pseudohalogen.

From the foregoing it is apparent that one of the starting materials for the third synthetic process of this invention is exemplified by a 5-methylnaphth[2,1-c]-1,2,5-oxatellurazole nucleus. However, any nucleus satisfying formula II in which q is 1 can be substituted for the 5-methylnaphth[2,1-c]-1,2,5-oxatellurazole nucleus. When a methine dye having only one aromatic 1,2,5-oxatellurazole nucleus is desired, an additional starting material represented by formula XXV or XXVI is employed, wherein G or G' is represented by formulae XXVIII, XXIX, or XXX. In view of the detailed descriptions that have been presented above the varied forms of the materials of formulae II, XXV, XXVI, XXVII, XXVIII, XXIX, and XXX are apparent and are not repeated here.

The remaining essential starting material is the compound of formula XXIV. When p is zero and $L^3$ is —CH=, it is apparent that the compound of formula XXIV is a diarylformamidine, typically diphenylformamidine. It can be seen that when p is a positive integer the resulting compounds of formula XXIV are vinylogous analogues of diarylformamidine.

When the diarylformamidine or vinylogous analogue represented by formula XXIV is reacted with the compound of formula XXV wherein G satisfies one of XXVIII, XXIX, and XXX, it is apparent that the resulting compound is a conventional intermediate for the preparation of cyanine and merocyanine dyes. Although these intermediates are often directly employed, their reactivity can be increased by acyl substitution of the N-hydrogen, such as by reaction with a carboxylic acid or its anhydride. Acetyl substituted intermediates are most commonly employed. When these intermediates contain a quaternary ammonium nucleus, as illustrated by formulae XXVIII and XXIX, the resulting intermediates are often referred to as I.C.I. intermediates, whereas when the intermediates contain a ketomethylene or cyanomethylene nucleus, as illustrated by formula XXX, the resulting intermediates are often referred to as Dains intermediates. A discussion of I.C.I. and Dains intermediates and their use in the synthesis of cyanine and merocyanine dyes is provided by T. H. James, *The Theory of the Photographic Process*, cited above, pp. 195–211.

When the diarylformamidine or vinylogous analogue represented by formula XXIV is reacted with the compound of formula XXV wherein G satisfies formula XXVII, the result is a novel intermediate for dye preparation. In this instance the site of reaction at a methyl substituent of an aromatic nucleus fused with the 1,2,5-oxatellurazole ring is unusual, since methyl substituents of aromatic nuclei fused with heterocyclic rings to form known cyanine, oxonol, and merocyanine dyes do not possess comparable reactivity. However, once the reaction has occurred, the resulting dye intermediates containing an aromatic 1,2,5-oxatellurazole nucleus can be employed similarly to known I.C.I. and Dains intermediates in completing methine dye preparation.

The dye intermediates resulting from the reaction of formulae XXIV and XXV and optionally acylated can be represented by formula XXXI:

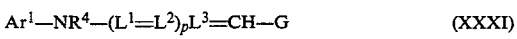

$$Ar^1-NR^4-(L^1{=}L^2)_pL^3{=}CH-G \quad (XXXI)$$

wherein

R[4] represents hydrogen or acyl and the remaining symbols are as previously defined.

Completion of the dye of formulae XXIII is accomplished by condensing the compound of formula XXVI with the dye intermediate of formula XXXI. Except for the unexpected reactivity of the methyl substituted aromatic 1,2,5-oxatellurazole nucleus which accounts for at least one of G—CH$_3$ and G'—CH$_3$ the entire reaction sequence from starting materials to final dye is similar to syntheses known for the preparation cyanine and merocyanine dyes. The reactions generally occur at room temperature, although heat can be applied to accelerate reactions, as desired. The reactions can be completed in the same solvents employed in the first and second dye preparation processes according to this invention described above.

The third preparation process is more general than the first and second processes in that it allows for a greater number of methine groups linking the dye nuclei. Following the third preparation process as many substituted or unsubstituted vinyl groups can be present in the methine linkage of the nuclei as desired. In practice, in view of the bathochromic shift in dye absorption imparted by the presence of one or more aromatic 1,2,5-oxatellurazole nuclei, it is seldom necessary for p in formulae XXIII to exceed 3 to achieve desirably long wavelength dye absorptions.

In reviewing the structures of the various dyes it is apparent that the dyes can exhibit a net ionic charge or be ionically neutral, the latter being represented in different resonance forms as either nonionic or zwitterionic. In general, the dyes which incorporate a nitrogen atom auxochrome that is in one resonance form quaternized are generally ionically neutral by reason of concurrent halogen ionization, unless one or more ionized substituents, such as an ionized quaternizing substituent, are included. On the other hand, the dyes which contain an acidic nucleus of the type found in oxonol or merocyanine dyes, as illustrated by formulae VIII, IX, and XVI, are typically anionic absent an additional ionic moiety. The symbol Mm is included in the formulae to indicate the presence or absence of a cation or anion, as is required to impart ionic charge neutrality to the dyes. Whether a particular dye is cationic, anionic, or without a net ionic charge will depend on its auxochromes and substituents. It is appreciated that counterions are spontaneously associated with the dyes as they are prepared, but can be readily exchanged. Exemplary cations are ammonium and alkali metal ions while exemplary anions include halide, tosyl, and trifluoromethanesulfonate anions.

In one preferred application, the dyes of the invention can be incorporated in an optical recording element. Such elements in one typical form are comprised of a support and, coated thereon, a recording layer of an amorphous composition having a absorption factor of at least 20 comprised of binder and a dye. The dye can be a methine dye containing at least one aromatic 1,2,5-oxatellurazole nucleus according to this invention.

Such elements are useful for information recording. For example, information supplied to the optical recording element in the form of a modulated scanning laser beam is recorded by the amorphous composition in the form of spatially related thermally induced deformations. Typically, the laser beam is focused onto the surface of the recording layer of the element. The recording layer absorbs energy from the laser beam so that small portions of the layer melt, burn, evaporate, or are otherwise displaced. Relative motion of the laser and recording layer, usually continuous, together with pulsing or modulation of the laser produce discrete pits or holes of varying sizes in the recording layer. The encoded information is reflected in the size and/or spacing of the holes in the recording layer.

The function of the dye is to absorb the energy imparted by the laser in the recording layer, thereby faciliting energetically efficient thermal deformation of the recording layer. For the dye to accomplish this function it is necessary for it to absorb electromagnetic radiation at the wavelength of laser emission. Generally it is preferred that the dye have an absorption peak approximately corresponding to the wavelength of laser emission.

The optimum choice of dyes is therefore dictated by the wavelength of laser emission. While lasers emitting in various regions of the electromagnetic spectrum are known, highly desirable lasers for use in optical recording applications are diode lasers having emissions in the range of from about 750 to 900 nm, preferably from about 750 to 850 nm.

Optical recording elements intended to be employed with a diode laser emitting in the 750 to 900 nm region of the spectrum are disclosed in *Research Disclosure*, Vol. 175, November 1978, Item 17522, and in U.S. Pat. No. 4,446,223, cited above. The optical recording elements of this invention are distinguished by the dyes employed, which in turn influence the favorable stability and absorption factors realized.

The methine dyes of this invention are compatible with binders which are useful in making laser recording elements. By "compatible" it is meant that the dye can be mixed with the binder in sufficient concentration to provide a sufficiently high absorption factor to form pits without crystallizing after a layer of the dye and binder is coated and dried. That is, the layers are amorphous. Generally, the described dyes are compatible in dye and binder compositions comprising up to at least 50 percent dye by weight, although higher concentrations and therefore higher absorption factors are possible. Because of the high extinction coefficients of many of the present dyes at wavelengths from 750 to 900 nm and their compatibility with common binders, these dyes can be included in the composition over a very wide range of concentrations while maintaining the necessary absorption characteristics.

Useful binders include any film forming material which is capable of being deformed upon exposure to high energy density radiation such as a laser beam. Useful binders include cellulose acetate butyrate, polystyrenes, polysulfonamides, polycarbonates, cellulose nitrate, poly(ethyl methacrylate), poly(vinyl butyral) and the like. Combinations of binders can also be used. Cellulose nitrate is the preferred binder.

A useful laser recording element comprises a support having coated thereon a layer of the dye and the binder. Depending upon the desired mode of reading the element, the support is either reflective or transparent. In the case of a reflective support, both sides of the support can be reflective and a recording layer can be provided on each side. The support can be any of a wide variety of materials including glass, a self-supporting polymer film, such as poly(ethylene terephthalate) or cellulose acetate, or metal. The support must have a relatively high melting point in order to avoid deformation of the support during recording. The support is desirably very smooth to minimize noise. In certain preferred embodiments, the support is coated with a smoothing layer prior to the coating of the reflective surface and the described dye-binder composition.

The composition which is used as a smoothing layer is preferably a low-viscosity, polymerizable fluid which can be coated on the surface of the support. Following coating, polymerization of the fluid produces a microsmooth surface on the support. The support can be made reflective by vacuum metalization of the smooth surface. In preferred embodiments, the polymerizable fluid comprises photopolymerizable monomers. Preferably, the monomer or mixture of monomers forms a low-viscosity fluid in the absence of a solvent. Useful polymerizable fluid compositions are described in U.S. Pat. Nos. 4,092,173 and 4,171,979.

The recording layer comprised of the described dye and binder is coated by a wide variety of methods. Most conveniently, the dye and binder are coated from a common solvent or, alternatively, from a mixture of miscible solvents. The dye and binder composition can be coated by spray coating, air knife coating, whirl coating or by any other suitable method. The thickness of the recording layer according to the present invention is not critical; however, best results are obtained when the thickness of the layer is between about 0.1 and about 10 μm.

The described recording compositions having an absorption factor of at least 20 are capable of producing depressions or holes surrounded by sharply defined ridges. This type of deformation can be read back using a read beam which is not capable of deforming the recording layer. By "sharply defined ridge" is meant that the ridge and hole or depression have noticeable boundaries and that, as measured in the plane of the undeformed outer surface of the layer, the width of the ridge is less than or equal to the breadth of the hole depression. These dimensions can be measured from an electron micrograph.

The thickness, absorption factor, and index of refraction of the recording compositions of the present invention can be optimized as described in Research Disclosure, Vol. 206, June 1981, Item 20635. For high quality recordings having a carrier-to-noise ratio of at least 40 decibels, it is preferred that the recording layer have an absorption factor of at least 20. The "absorption factor" is defined as the product of the weight fraction of dye included in the amorphous composition formed by the binder and dye in the recording layer and the molar extinction coefficient of the dye at the wavelength of maximum dye absorption, which usually corresponds to or approximates the wavelength of laser emission, divided by the molecular weight (MW) of the dye. The absorption factor is usually recited in terms of the units liter per gram-centimeter. From the absorption factor definition it is apparent that dyes which achieve bathochromic absorptions with reduced numbers of methine linking groups exhibit relatively lower molecular weights and can exhibit higher absorption factors.

In another preferred application the dyes of this invention can be incorporated in photographic elements. The photographic elements include those comprised of a support, one or more layers, including at least one radiation recording layer, and a methine dye according to this invention containing an aromatic 1,2,5-oxatellurazole nucleus.

The location of the inventive dye within the photographic element can be varied, depending upon the function it is intended to perform. For example, when the dye is intended to perform a filtering function, reducing the amount of radiation of a type and/or wavelength the dye is capable of absorbing reaching the recording layer, the dye can be usefully incorporated in a layer interposed between the source of exposing radiation and the recording layer. When the dye is intended to perform an antihalation function—that is, absorbing radiation that would otherwise be reflected back to the radiation recording layer, the dye is usefully incorporated in a layer lying behind the recording layer in relation to a source of exposing radiation. Placement of the dye in the support itself rather than in a separate layer is compatible with performing filtering and antihalation functions. Where the dye is intended to improve sharpness by reducing scatter of exposing radiation within the recording layer itself, then the dye is necessarily incorporated in the recording layer.

The utility of the dyes of this invention in photographic elements can be illustrated by reference to silver halide photographic elements. A variety of such photographic elements and dyes known to be useful in combination therewith are disclosed in *Research Disclosure*, Item 17643, cited above. The dyes of the invention when employed for filtering and antihalation applications can be substituted for or supplement conventional dyes for performing these functions, as disclosed in Section VIII, Absorbing and scattering materials.

The methine dyes of the present invention are also useful as alternatives to conventional desensitizers for silver halide emulsions, such as those disclosed in Section IV, Spectral sensitization and desensitization, paragraph K. Desensitizers are useful in reducing the photographic speed of silver halide emulsion layers and can also be employed to permit room light handling of silver halide emulsions when it is intended to record exposure to other forms of radiation, such as X-rays, as illustrated by U.S. Pat. No. 3,237,008, cited above.

The dyes according to this invention can be employed in radiographic elements to reduce cross-over. In radiographic elements intended to be exposed by fluorescent screens stimulated by X-ray exposure, crossover exposure of a silver halide emulsion layer by a fluorescent screen on the opposite side of a transparent film support can be reduced by incorporating a dye according to the present invention in a layer located between the support and the silver halide emulsion layer or in the support itself. An expanded description of cross-over is provided in U.S. Pat. Nos. 4,425,425 and 4,425,426.

EXAMPLES

The invention is further illustrated by the following examples:

For more compact presentation a number of symbols and abbreviations are employed, which are listed below:

Ac=acetyl
AcO=acetic anhydride
BzNO$_2$=nitrobenzene
CH$_2$Cl$_2$=dichloromethane
CH$_3$CN=acetonitrile
C$_6$H$_{12}$=cyclohexane
C$_7$H$_8$=toluene
DMF=dimethylformamide
DMSO=dimethylsulfoxide
EtOH=ethanol
Et$_3$N=triethylamine
MeOH=methanol
pts=p-toluenesulfonate
$\epsilon_{max}$=extinction coefficient at maximum absorption
$\lambda_{max}$=the wavelength of an absorption peak Other symbols not listed are employed to represent their art recognized meanings.

In the numbered paragraphs which follow the prefix P is employed to indicate preparations of starting materials while the prefix E is employed to indicate claimed subject matter.

P-1 THRU P-4

P-1 through P-4 illustrate the preparation of compounds according to the following general formula

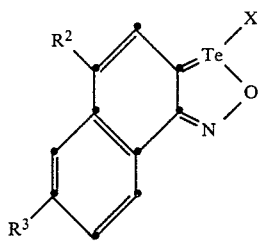

P-1 3-Chloronaphth[2,1-c]-1,2,5-oxatellurazole
R$^3$=R$^2$=H, X=Cl
C$_{10}$H$_6$ClNOTe
mw=319.22.

Tellurium dioxide (80 g, 0.5 mole) was dissolved in concentrated hydrochloric acid (200 ml, 2.0 moles) with stirring. When solution was complete, a suspension of hydroxylamine hydrochloride (69 g, 1.0 mole) in ethyl alcohol (300 ml) was added. When all solid was dissolved, α-tetralone (73 g, 0.5 mole) in ethyl alcohol (1200 ml) was added. The clear reaction mixture rapidly turned red and dark crystals began to form within an hour. After the reaction mixture had been kept five days at room temperature, the product was isolated by filtration and dried in a vacuum. Yield 123.2 g.

The product was separated from elemental tellurium by continuous extraction with dichloromethane in a Soxhlet extractor, using about 1300 ml of solvent. Chilling the extract yielded a first crop of 84.9 g. Diluting the filtrate with twice its volume of heptane yielded a second crop of 6.1 g. The combined yield of 91.0 g represented a 57% yield. m.p. 182°–183° C. λ-max (in pyridine) was 503 nm. $\epsilon$-max=0.82×10$^4$. C, H, Cl, N, O, and Te elemental analyses results and the mass spectra were in agreement with those expected for the structural formula.

P-2 3-Bromonaphth[2,1-c]-1,2,5-oxatellurazole
R$^3$=R$^2$=H, X=Br
C$_{10}$H$_6$BrNOTe
mw=363.68

Alpha-tetralone oxime (24 g=0.05 mole), tellurium dioxide (35 g=0.22 mole), lithium bromide (60 g), and acetic acid (350 ml) were combined, and the mixture was heated to a gentle boil for 20 minutes. The precipitated solid was collected by filtering the reaction mixture hot and washing the product with water to give 38.9 g, 71% of theory, of a deep maroon solid. The product was recrystallized from carbon tetrachloride (m.p. 183°–185° C.). Elemental analyses and the mass spectra were in agreement with the those expected for structural formula.

P-3
3-Chloro-5-methylnaphth[2,1-c]-1,2,5-oxatellurazole,
R$^3$=H, R$^2$=CH$_3$, X=Cl
C$_{11}$H$_8$ClNOTe mw=333.24

Tellurium dioxide (79.5 g=0.5 mole) was dissolved in concentrated hydrochloric acid (200 ml). Hydroxylamine hydrochloride (35 g=0.5 mole) was added and then ethanol to bring the total volume to 2000 ml. To the slightly turbid solution was added 4-methyl-α-tetralone (80 g=0.5 mole) and the stirred mixture heated briefly to boil. The clear deep red solution was then kept overnight at room temperature. The solid mass of crystalline product was collected, washed well with water and dried in a vacuum oven at 90° C. to give a first crop (111.1 g) of dark red needles. The filtrate was heated once again and kept at room temperature for 24 hours. A second crop of 14.3 g crude product was obtained. The well-dried product was placed into a Soxhlet thimble and extracted with methylene chloride. The majority of purified product crystallized from the solvent during the course of the extraction to give a yield of 97.0 g=58.3% of theory, m.p. 196°–198° C. Elemental analyses results were in agreement with the structural formula. The ultraviolet and visible spectra in dichloromethane showed three maxima.

λ-max: 507 nm: $\epsilon$-max=1.21×10$^4$
λ-max: 300 nm: $\epsilon$-max=1.06×10$^4$
λ-max: 256 nm: $\epsilon$-max=2.30×10$^4$ P-4
3-Chloro-7-methoxynaphth[2,1-c]-1,2,5-oxatellurazole,
R$^3$=OCH$_3$, R$^2$=H, X=Cl
C$_{11}$H$_8$ClNO$_2$Te mw=349.24

This compound was prepared in the same general way as the corresponding compound of Example 4, except that 6-methoxy-α-tetralone (88.1 g=0.5 mole) was used as the starting ketone. The step of heating of the reaction mixture to boil and then keeping it at room temperature was repeated three times, giving a combined crude yield of 84.8 g. Recrystallization by Soxhlet extraction with dichloromethane gave 72.5 g, 41.5% yield, of small dark needles (m.p. 237°–239° C.). Elemental analyses results were in agreement with the structural formula. The ultraviolet and visible spectra in dichloromethane showed four maxima.

510 nm: $\epsilon$-max=$0.89 \times 10^4$
454 nm: $\epsilon$-max=$0.93 \times 10^4$
312 nm: $\epsilon$-max=$0.81 \times 10^4$
245 nm: $\epsilon$-max=$2.63 \times 10^4$

E-5

E-5 illustrates a first general process for preparing dyes according to this invention wherein a tertiary ethylamine to be incorporated in the dye chromophore is employed as a starting material.

E-5
3-Chloro-5-(2-diethylaminovinyl)naphth[2,1-c]-1,2,5-oxatellurazole $C_{10}H_6ClNOTe$
mw=319.22.

3-Chloronaphth[2,1-c]-1,2,5-oxatellurazole (3.18 gm, 0.01 mole) was dissolved in acetonitrile (300 ml). Triethylamine (1.0 gm, 0.01 mole) was added. The mixture heated under reflux for 30 minutes. The deep blue mixture was filtered hot from precipitated by-products and cooled slowly to room termperature over a weekend to yield well-formed shiny crystals with a golden reflection. Yield 1.0 gm=24% of theory; m.p. 232°–235° C.; $\lambda$-max=653 nm; $\epsilon$-max=$4.58 \times 10^4$ (pyridine). Elemental analysis was in agreement with that calculated for the empirical formula.

E-6 THRU E-9

E-6 through E-9 illustrate a second general process for preparing dyes according to this invention wherein a methylene base is employed as a starting material.

E-6
3-Chloro-5-(3-methyl-2-benzothiazolinylidenemethyl)-naphth[2,1-c]-1,2,5-oxatellurazole $C_{19}H_{13}ClN_2OSTe$
mw=480.44

3-Chloronaphth[2,1-c]-1,2,5-oxatellurazole (6.4 gm-0.02 mole) and 2,3-dimethylbenzothiazolium p-toluenesulfonate (7.0 gm=0.021 mole) were jointly dissolved in hot pyridine (150 ml). There was a rapid reaction to a dark blue color and a coppery precipitate appeared. The hot solution was filtered and the contents of the filter extracted with boiling pyridine until 500 ml filtrate had accumulated. On cooling, 9.6 gm coppery flakes were deposited. The material was recrystallized from 1300 ml of boiling pyridine, to give a recovery of 5.31 gm=55% yield, m.p. slow decomposition 270°–310° C. The mass spectrum and the NMR spectrum were in agreement with the assigned structure. The ultraviolet and visible spectra showed one maximum.

$\lambda$-max (Pyridine)=696 nm.
$\epsilon$-max=$5.23 \times 10^4$.

E-7 Preparation of 3-Chloro-5-(3-octadecyl-2-benzothiazolinylidenemethyl)-naphth[2,1-c]-1,2,5-oxatellurazole $C_{36}H_{47}ClN_2OSTe$
mw=718.91.

2-Methyl-3-octadecylbenzothiazolium pts (11.4 g., 0.02 moles) and 3-chloronaphth[2,1-c]-1,2,5-oxatellurazole (6.4 g., 0.02 moles) were suspended in DMF (100 ml.). Et$_3$N (2 g.) was added and the mixture was stirred for 25 min. at room temperature. The coppery crystals were filtered off from the greenish-brown liquid, washed with acetone until the effluent was generally clear, and air dried. Yield 11.4 g. The dye was recrystallized twice from toluene. Yield 8.7 g. (51%).

E-8 Preparation of 3-Chloro-5-(1,3-diethyl-2,3-dihydro-1H-imidazo[4,5-b]-quinoxalin-2-ylidenemethyl)naphth[2,1-c]-1,2,5-oxatellurazole $C_{24}H_{20}ClN_5OTe$
mw=557.51

1,3-Diethyl-2-methyl-1H-imidazo[4,5-b]quinoxalinium pts (8.25 g., 0.02 moles) and 3-chloronaphth[2,1-c]-1,2,5-oxatellurazole (6.4 g., 0.02 moles) were dissolved in DMF (150 ml). Et$_3$N (2 g.) was added. The resultant deep green solution was stirred at room temperature for 30 min. Concentrated HCl (3 ml.) was added and after 10 minutes stirring the solution was chilled. The crystals were filtered off, washed with acetone, water and MeOH and air dried. Yield 7 g. (63%).

The dye was purified first by recrystallization from hot DMSO (300 ml). Yield 4.3 g. A second recrystallization was carried out from DMSO (150 ml.) heated to near boiling. MeOH (100 ml.) was added to the filtered solution to aid reprecipitation. Yield 3.3 g.

E-9 Preparation of 3-Chloro-5-(1-methylnaphtho[1,2-d]thiazol-2-ylidenemethyl)naphth[2,1-c]-1,2,5-oxatellurazole $C_{23}H_{15}ClN_2STe$
mw=530.5

1,2-Dimethylnaphtho[1,2-d]thiazolium pts (7.7 g., 0.02 moles) and 3-chloronaphth[2,1-c]-1,2,5-oxatellurazole (6.4 g., 0.02 moles) were dissolved in DMF (150 ml.). With stirring, Et$_3$N (2 g.) was added and stirring at room temperature was continued for 4 hours. The solid dye was filtered off, washed with acetone, MeOH and acetone in sequence and air dried. Yield 7.5 g. When DMSO was used as solvent during purification the dye was isolated with one equivalent of DMSO in the crystal lattice.

P-10, E-11, AND E-12

P-10, E-11, and E-12 illustrate a third general process for preparing dyes according to this invention wherein an N,N'-diarylformamidine or a derivative is employed as a starting material.

P-10 Preparation of 5-(2-Acetanilidovinyl)-3-chloronaphth[2,1-c]-1,2,5-oxatellurazole 3-Chloro-5-methylnaphth[2,1-c]-1,2,5-oxatellurazole (16.5 g., 0.050 moles) and N,N'-diphenylformamidine (15 g., 0.075 moles) were added to Ac₂O (350 ml) and heated to reflux with good stirring. Refluxing was maintained for 1½ hours. The reaction mixture was filtered while hot and then cooled. The solid which precipitated was filtered off, washed with acetone and either in order and air dried. Yield 11.2 g. (47%).

E-11 Preparation of

3-Chloro-5-[3-(3-octadecyl-2-benzothiazolinylidene)-1-propen-1-yl]naphth[2,1-c]-1,2,5-oxatellurazole $C_{38}H_{49}ClN_2OSTe$
mw = 744.93

2-Methyl-3-octadecylbenzothiazolium pts (5.7 g., 0.01 moles), 3-chloro-5-(2-acetanilidovinyl)naphtho[2,1-c]-1,2,5-oxatellurazole (4.8 g., 0.01 moles) and Et₃N (1 g.) were added in order to DMF (50 ml.) with stirring at room temperature. Stirring was continued for 20 minutes and then lithium chloride (10 g.) was added. Dark participate formed which after cooling to room temperature was collected by filtration, washed with MeOH and acetone and dried in air at room temperature. Yield 5.2 g.

The dye was recrystallized twice from hot toluene (20 ml/g) to yield glittering platelets which separated on chilling.

E-12 Preparation of 3-Chloro-5-[3-(1-ethylnaphtho[1,2-d]thiazolin-2-ylidene)-1-propen-1-yl]naphth[2,1-c]-1,2,5-oxatellurazole $C_{26}H_{19}ClN_2OSTe$ 1-Ethyl-2-(2-anilinovinyl)naphtho[1,2-d]thiazolium pts (5 g., 0.01 moles), Ac₂O (1.02 g.) and Et₃N (1.01 g.) were added in order to DMF (100 ml.). To the resulting clear solution 3-chloro-5-methyl-naphth[2,1-c]-1,2,5-oxatellurazole (3.33 g., 0.11 moles) was added followed by another equivalent of Et₃N and by LiCl (8 g.). A dark green color and solids developed. After 1½ hr. stirring a little acetone was added and the mass was filtered, washed with DMF, water, MeOH and acetone until the effluent was nearly colorless. The dye was recrystallized three times from hot DMSO. (150 ml/g.). Yield 2.0 g. (35%).

E-13 SUMMARY OF ABSORPTION CHARACTERISTICS

Table I contains a summary of absorption data. As illustrated by the dye prepared in E-11, the positions of the absorption peaks in these dyes are solvent dependent.

TABLE I

| Dye | λ max (nm) | | | | | | $\epsilon$ max ($\times 10^{-4}$) $CH_2Cl_2$ |
|---|---|---|---|---|---|---|---|
| | BzNO | $CH_2Cl_2$ | Acetone | $CH_3CN$ | $C_7H_8$ | $C_6H_{12}$ | |
| E-5 | | 648 | | | | | 6.49 |
| E-6 | | 692 | | | | | 6.77 |
| | | 458 | | | | | 1.44 |
| | | 377 | | | | | 1.34 |
| E-7 | | 692 | | | | | 6.76 |
| | | 458 | | | | | 1.37 |
| | | 377 | | | | | 1.29 |
| E-8 | | 706 | | | | | 8.50 |
| | | 432 | | | | | 2.00 |
| | | 392 | | | | | 2.12 |
| E-9 | | 712 | | | | | 6.39 |
| | | 470 | | | | | 1.25 |
| | | 385 | | | | | 1.39 |
| E-11 | 842 | 830 | 823 | 818 | 807 | 766 | 12.66 |
| | | 515 | | | | | 1.37 |
| | | 448 | | | | | 1.86 |
| | | 407 | | | | | 1.63 |
| E-12 | | 854 | | | | | 10.73 |
| | | 785 | | | | | 5.59 |
| | | 527 | | | | | 0.98 |

E-13 THROUGH E-36

The dyes of examples E-5 through E-9 and E-10 through E-12 were tested in a sulfur and gold sensitized 0.2 μm monodispersed gelatino-silver bromoiodide emulsion containing 2.5 mole percent iodide. Each dye was added to a separate portion of the emulsion at the concentrations of 2.0, 6.0 and 8.0 mmoles/mole of silver and the resulting mixtures were coated to obtain a silver coverage of 0.7 g/m² and 7.32 g gelatin/m² on a cellulose ester support. A portion of each coating was exposed in a spectral sensitometer to a quartz-halogen light source through a Wratten ®80B color correcting filter, a diffraction grating with filters to remove second order transmission, and a superimposed step wedge. The coatings were developed in a Kodak X-Omat ® processor for 80 seconds at 35° C. in a hydroquinone-Elon ® (p-N-methylphenol hemisulfate) developer, fixed, washed and dried. A characteristic (density versus log exposure or D log E) curve was determined for each coating at 400 mn and at each 10 nm interval between 400 nm and 700 nm. No photographic speed could be determined from the curves, since the dyes in the coatings completely desensitized the coatings at all three concentration levels and at all wavelengths.

From the foregoing discussion it is apparent that the compounds of this invention can take a variety of forms and be readily applied to a variety of photographic uses. This invention has been described in detail with reference to preferred embodiments thereof, but it will be understood that variations and modifications can be effected within the spirit and scope of the invention.

What is claimed is:

1. A methine dye represented in alternate resonance forms by the formulae:

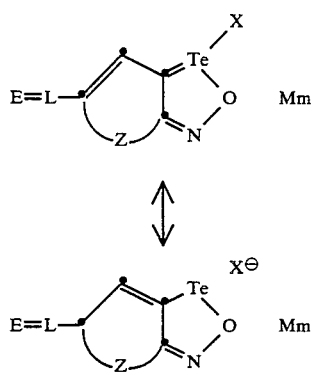

wherein

E represents an auxochrome;

L represents a methine linkage completing a conjugated resonance chromophore extending from said auxochrome to the tellurium atom of said formulae;

M represents a charge balancing counterion;

m is zero or 1;

X represents halogen or pseudohalogen; and

Z represents the atoms completing an aromatic nucleus.

2. A methine dye according to claim 1 in which said auxochrome in alternate resonance forms can be represented by the formulae:

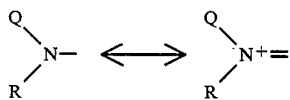

wherein

R is a quaternizing substituent and

Q is a quaternizing substituent which (i) is an independent quaternizing substituent, (ii) completes with the methine linkage a heterocyclic ring, or (iii) completes with R a heterocyclic ring.

3. A methine dye according to claim 2 in which said auxochrome in alternative resonance forms can be represented by the formulae:

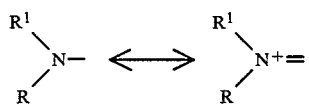

wherein

R and $R^1$ are quaternizing substituents which are independent or together form a heterocyclic ring.

4. A methine dye according to claim 2 in which said dye in alternate resonance forms can be represented by the formulae:

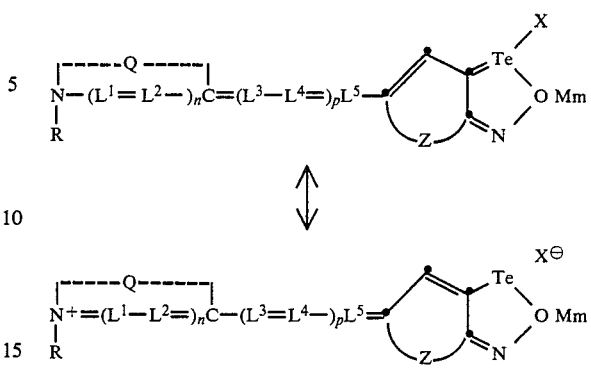

wherein $L^1$, $L^2$, $L^3$, $L^4$, and $L^5$ are methine groups;

M represents a charge balancing counterion;

m is zero or 1;

n is zero or 1;

p is zero, 1, 2, or 3;

Q represents the atoms completing a heterocyclic ring;

R is a quaternizing substituent;

X represents halogen or pseudohalogen; and

Z represents the atoms completing an aromatic nucleus.

5. A methine dye according to claim 2 in which said dye in alternate resonance forms can be represented by the formulae:

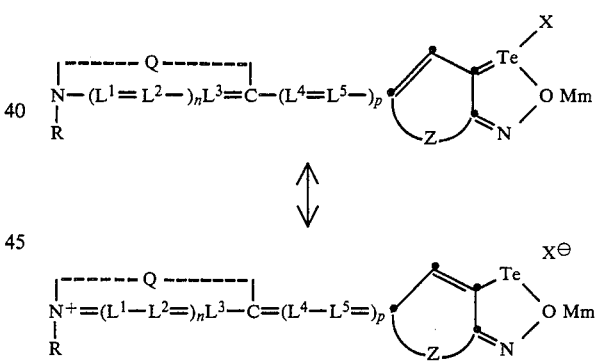

wherein $L^1$, $L^2$, $L^3$, $L^4$, and $L^5$ are methine groups;

M represents a charge balancing counterion;

m is zero or 1;

n is zero or 1;

p is zero, 1, 2, or 3;

Q represents the atoms completing a heterocyclic ring;

R is a quaternizing substituent;

X represents halogen or pseudohalogen; and

Z represents the atoms completing an aromatic nucleus.

6. A methine dye according to claim 1 in which E=L— and E—L= in alternate resonance forms can be represented by the formulae:

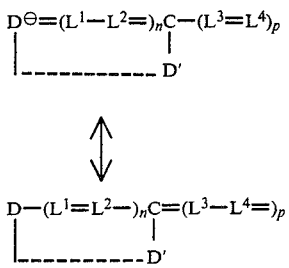

wherein
- D and D' are independent groups with D being a cyano, sulfo, or carbonyl group and D'0 being a methine substituent or D and D' together form a heterocyclic ring;
- $L^1$, $L^2$, $L^3$, and $L^4$ are methine groups;
- n is zero or 1; and
- p is zero, 1, 2, or 3.

7. A methine dye according to claim 1 in which X is chlorine or bromine.

8. A methine dye according to claim 1 in which Z completes a carbocyclic aromatic nucleus.

9. A methine dye according to claim 8 in which said carbocyclic aromatic nucleus and said oxatellurazole ring together form a naphth[2,1-c]-1,2,5-oxatellurazole nucleus.

10. A methine dye according to claim 9 in which said naphth[2,1-c]-1,2,5-oxatellurazole nucleus in alternate resonance extremes can be represented by the formulae:

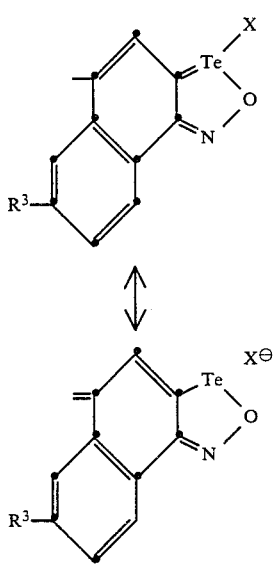

wherein
$R^3$ is selected from the group consisting of hydrogen, halogen, alkyl, and alkoxy.

11. A methine dye according to claim 10 in which said dye in alternate resonance forms can be represented by the formulae:

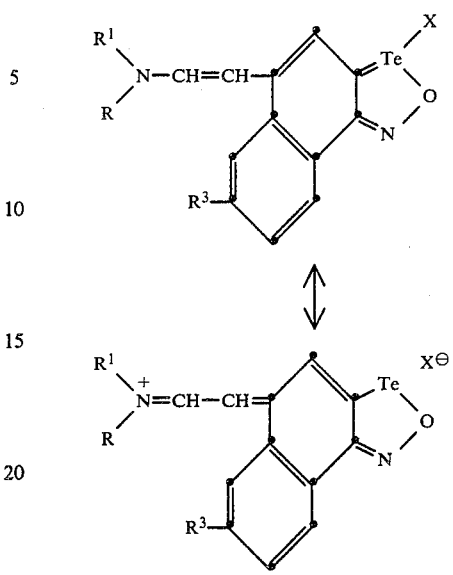

wherein
- R and $R_1$ are quaternizing substituents which are independent or together form a heterocyclic ring;
- $R^3$ is selected from the group consisting of hydrogen, halogen, alkyl, and alkoxy; and
- X is halogen or pseudohalogen.

12. A methine dye according to claim 11 in which R and $R^1$ together form a heterocyclic ring of atoms selected from the group consisting of carbon, nitrogen, and chalcogen atoms.

13. A methine dye according to claim 11 in which R and $R^1$ are independently selected from the group consisting of alkyl including substituted alkyl, aryl including substituted aryl, cyano, and oxy, thio, ester, or thioester groups.

14. A methine dye according to claim 13 in which R and $R^1$ are each ethyl groups and X is bromine or chlorine.

15. A methine dye according to claim 10 in which said dye in alternate resonance forms can be represented by the formulae:

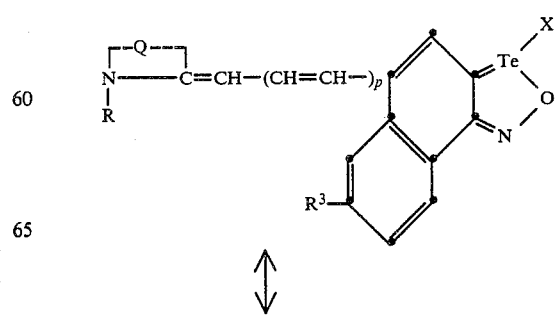

-continued

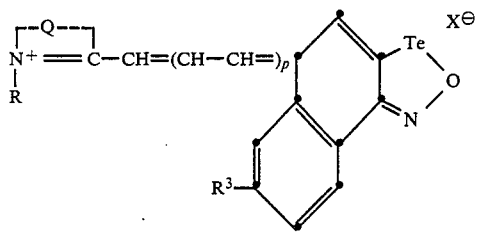

wherein
R is a quaternizing substituent;
R³ is selected from the group consisting of hydrogen, halogen, alkyl, and alkoxy;
p is zero or 1;
Q represents the atoms completing a heterocyclic ring; and
X is halogen or pseudohalogen.

16. A methine dye according to claim 15 in which X is bromine or chlorine.

17. A methine dye according to claim 10 in which said dye in alternate resonance forms can be represented by the formulae:

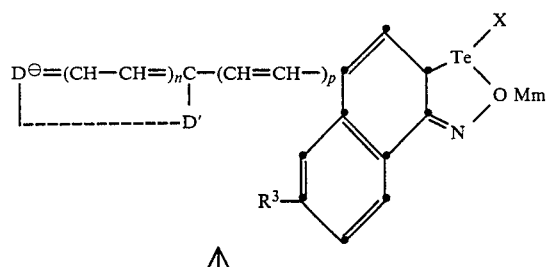

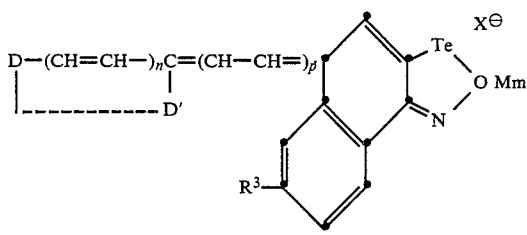

wherein
D and D' are independent groups with D being a cyano, sulfo, or carbonyl group and D' being a methine substituent or D and D' together form a heterocyclic ring;
M represents a charge balancing counterion;
m, n, and p are independently zero or 1;
R³ is selected from the group consisting of hydrogen, halogen, alkyl, and alkoxy; and
X represents halogen or pseudohalogen.

18. A methine dye according to claim 17 in which X is bromine or chlorine.

19. A process of preparing a methine dye which in one resonance form can be represented by the formulae:

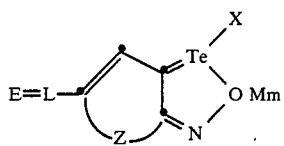

comprising condensing a 2-halo or pseudohalo-1,2,5-oxatellurazole of the formula:

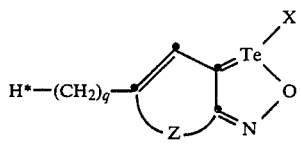

with a chromophore completing compound of the formula:

E—L' wherein
H* is an activated hydrogen atom;
E represents an auxochrome;
L represents a methine linkage;
L' represents a methine linkage precursor;
M represents a charge balancing counterion;
m is zero or 1;
q is zero or 1;
X is halogen or pseudohalogen; and
Z represents the atoms completing an aromatic nucleus.

20. A process of preparing a methine dye according to claim 19 in which said dye in alternate resonance forms can be represented by the formulae:

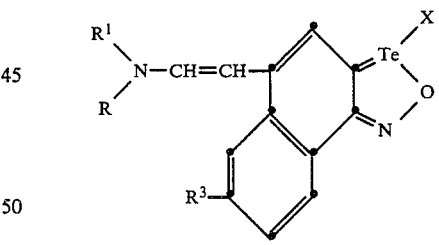

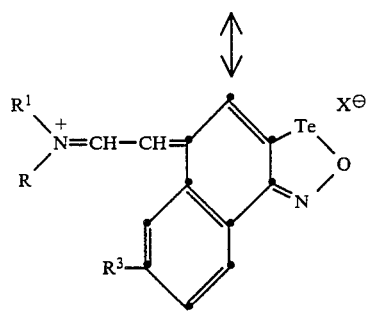

comprising condensing a 2-halo-1,2,5-oxatellurazole which in one resonance form can be represented by the formula:

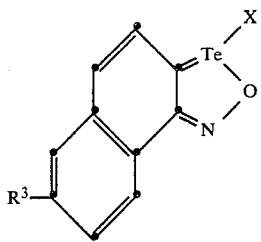

with a tertiary ethylamine, wherein

R and $R^1$ are quaternizing substituents which are independent or together form a heterocyclic ring;
$R^3$ is selected from the group consisting of hydrogen, halogen, alkyl, or alkoxy; and
X is chlorine or bromine.

21. A process according to claim 20 in which condensation is undertaken at a temperature of at least 60° C. in the presence of a stoichiometrically equal or greater amount of said tertiary ethylamine.

22. A process according to claim 21 in which condensation is undertaken at a temperature in the range of from 80° to 100° C.

23. A process according to claim 20, 21, or 22 in which said tertiary ethylamine is triethylamine.

* * * * *